No. 714,389. Patented Nov. 25, 1902.
R. McARTHUR.
ATTACHMENT FOR BOB SLEIGHS.
(Application filed Mar. 26, 1902.)
(No Model.)
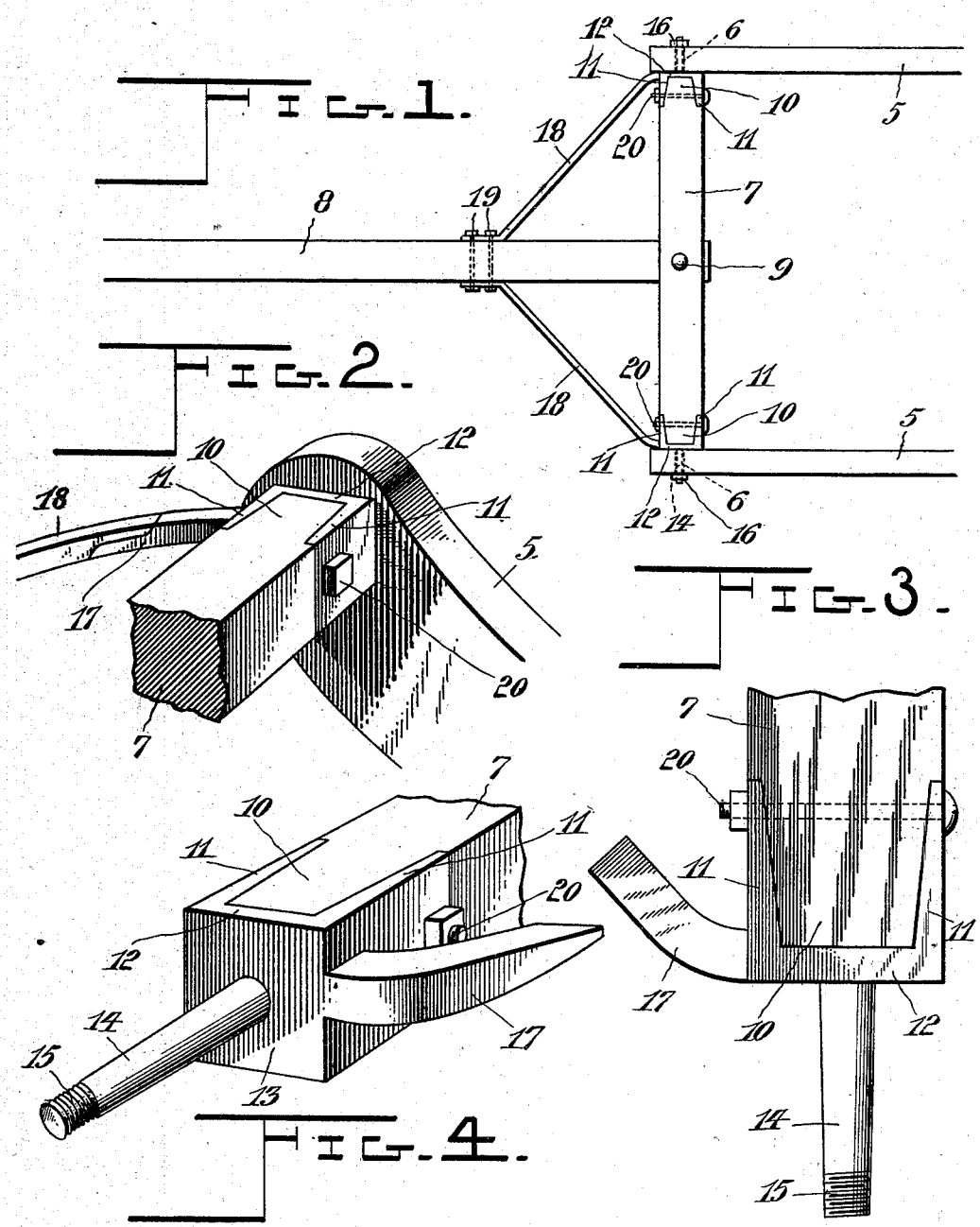

UNITED STATES PATENT OFFICE.

ROBERT McARTHUR, OF HOLLAND, CANADA.

ATTACHMENT FOR BOB-SLEIGHS.

SPECIFICATION forming part of Letters Patent No. 714,389, dated November 25, 1902.

Application filed March 26, 1902. Serial No. 100,040. (No model.)

*To all whom it may concern:*

Be it known that I, ROBERT MCARTHUR, a subject of the King of Great Britain, residing at Holland, county of Norfolk, Province of Manitoba, Canada, have invented certain new and useful Improvements in Attachments for Bob-Sleighs; and I do hereby declare that the following is a full, clear, and exact description of the invention, such as will enable others skilled in the art to which it appertains to make and use the same.

My invention has reference to an improvement in the construction of bob sleighs or sleds of the compound type, although it is equally applicable to ordinary wagon-sleighs with a single pair of sled-runners.

The part of the sleigh in which my improvement lies consists in an attachment formed of a single piece of metal with a roller-pivot in one end and having a recess for the insertion of the sled-roller in the other, as well as a tongue forming means for attachment of the hounds or diagonal braces which are attached to the tongue of the sleigh, and by this improved form of casting or forged piece the construction of the sled is both simplified and strengthened over that now in use.

I have shown my improvement in the accompanying drawings, wherein—

Figure 1 is a plan view showing the front portion of the sled and the rear portion of the tongue, including my improvement. Fig. 2 is an enlarged detail and perspective view of the piece constituting my improvement shown in position with runners, roller, and hound attached. Fig. 3 is a plan view of my improvement; and Fig. 4 is another enlarged perspective view from the opposite side, showing my improvement with runners and hound detached.

In Fig. 1 the sled-runners are shown at 5, being bent up at their ends in the ordinary fashion, and have holes bored transversely therethrough at 6 for the insertion of the roller-pivots. 7 is the roller, and 8 the tongue, of the sled, which is attached to the roller by a bolt 9 at the center thereof. The roller consists, preferably, of a bar or beam of wood rabbeted at its ends to form tenons 10, each of which is adapted for insertion into a socket of corresponding shape formed by the tapered flanges 11 on the attachment 12, which constitutes my improvement. The attachment 12 has a preferably square base portion 13 connecting the two flanges 11, and from the center of this base portion in the opposite direction projects a post 14, which forms the roller-pivot, being passed through the apertures in the ends of the sled-runner and having a screw-thread 15 on the outer end, over which is screwed a nut 16 to secure the runner in place on the pivot. From the front side of the base 13 there also projects a tongue-piece 17, which is preferably tapered and adapted to form a welding-tongue for welding the hound or diagonal brace 18 thereto, although, if preferred, the latter may be bolted to the tongue 17 or secured in any other desirable manner. The hounds 18 are bent diagonally toward the center and secured to the tongue by means of bolts 19 in the ordinary manner. The tenon 10 of the roller end is inserted into the recess formed by the flanges 11 and secured to the attachment by means of a transverse bolt 20, passing through suitable holes in the roller and flanges.

Having thus described my invention, what I claim, and desire to secure by Letters Patent, is—

As an improved article of manufacture, the roller-holding attachment described comprising in a single element a base portion with a post projecting from one side thereof, flanges projecting from the opposite side and tapered upon their adjacent faces to receive the end of the roller, and a tongue-piece projecting in an inclined direction from the front side of said base-piece and tapered for the purpose of welding the hound thereto, all substantially as shown and described.

In witness whereof I have hereunto set my hand in the presence of two witnesses.

ROBERT McARTHUR.

Witnesses:
JOHN MAIR,
E. D. SHARPE.